(12) United States Patent
Yoon et al.

(10) Patent No.: US 7,710,627 B2
(45) Date of Patent: May 4, 2010

(54) MICROACTUATOR

(75) Inventors: Jin-wook Yoon, Yongin-si (KR);
Yong-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 12/055,360

(22) Filed: Mar. 26, 2008

(65) Prior Publication Data

US 2009/0080051 A1 Mar. 26, 2009

(30) Foreign Application Priority Data

Sep. 21, 2007 (KR) ............. 10-2007-0096941

(51) Int. Cl.
*G02B 26/08* (2006.01)
(52) U.S. Cl. ................................. 359/224.1
(58) Field of Classification Search ... 359/223.1–226.1, 359/290, 291, 871, 872
See application file for complete search history.

(56) References Cited

U.S. PATENT DOCUMENTS

| 6,956,684 | B2 | 10/2005 | Orcutt |
| 7,259,900 | B2 * | 8/2007 | Orcutt ............ 359/224.1 |
| 2005/0225821 | A1 | 10/2005 | Orcutt |

* cited by examiner

*Primary Examiner*—Euncha P Cherry
(74) *Attorney, Agent, or Firm*—Staas & Halsey LLP

(57) ABSTRACT

A microactuator including a base frame; and a moving plate having both ends supported by a plurality of elastic support portions inside the base frame, the moving plate having a first side on which a reflective mirror for changing a light path is disposed. At least one first rib is disposed along an edge of a second side of the moving plate, which is the reverse side of the first side of the moving plate, and a second rib is disposed in the center of the second side of the moving plate and correspondingly encloses a permanent magnet. Also, a portion of the second side of the moving plate, except for the first and second ribs, is removed to a predetermined depth to reduce the weight of the entire moving plate and to define the first and second ribs.

17 Claims, 4 Drawing Sheets

MICROACTUATOR

CROSS-REFERENCE TO RELATED APPLICATION

This application claims the benefit of Korean Patent Application No. 2007-96941, filed in the Korean Intellectual Property Office on Sep. 21, 2007, the disclosure of which is incorporated herein by reference.

BACKGROUND OF THE INVENTION

1. Field of the Invention

Aspects of the present invention relate to a microactuator, which reflects light to change a light path.

2. Description of the Related Art

In recent years, the development of printers and other image forming apparatuses has been oriented toward increasing printing speed. In order to design high-speed printers, it is necessary to accelerate the operations of a polygon mirror, since the operation of the polygon mirror significantly affect the printing speed of the printers. However, since a spindle motor, which is required for driving most polygon mirrors, operates presently at a limited speed due to restrictions of oscillation, noise, and bearings, the speed of the polygon mirrors is limited to about 40,000 rpm (about 28 ppm) or lower. Accordingly, a new apparatus that can replace the spindle motor and the polygon mirror is required for ever-increasing the printing speed of printers.

In order to replace the spindle motor and the polygon mirror, a micro-electro-mechanical system (MEMS) microactuator has been developed. MEMS microactuators, most of which are hinged structures, are inexpensive and have good performance. However, a better performance is required for such microactuators to fulfill recent requirements for high speed and large displacement. It is difficult for the microactuators to meet both high-speed and large-displacement demands.

U.S. Pat. No. 6,956,684, which has been assigned to Texas Instruments Inc., discloses a hinged device that operates due to rotary power generated by an electromagnetic force, wherein a magnet is attached to a rotation body and a fixing body that excites the rotation body and has a bobbing coil. U.S. Pat. No. 6,956,684 discloses a method of attaching a magnet to a front side of an attaching member of a hinge layer and bonding a back layer having a compensation mass moment to a back side of the attaching member of the hinge layer such that the center of mass of the combined front and back layers is substantially coplanar with an axis of rotation of the hinged device in order to stabilize a scan operation. Furthermore, the attaching member and a back portion of the front layer define a spine structure, which allows reduction of weight and mass of the hinged device while maintaining the stiffness of the rotation body.

However, the mass of the rotation body is increased by use of the back layer having the compensation mass moment. Although the spine structure has been proposed to overcome this problem, the size (especially the height) of the entire rotation body is still increased. Also, since many components are used, the manufacture of the disclosed hinged device is difficult and costly.

As another example, U.S. Patent Publication No. 2005/0225821, which has been published by Texas Instruments Inc., discloses a hinged device having an optical surface. To allow balancing of the hinged device so that the center of mass of the hinged device is on the pivoting axis, a recess is formed in the optical surface instead of adding a back layer having a compensation mass moment. Here, since a hinge portion has the same thickness as the entire structure, controlling a resonance frequency and induced stress is difficult to achieve.

SUMMARY OF THE INVENTION

Aspects of the present invention provide a microactuator, which reduces the mass of a moving plate to maintain high stiffness and increase a resonance frequency and prevents a centralization of stress induced during the rotation of the moving plate.

According to an aspect of the present technical concept, a microactuator is provided. The microactuator includes a base frame; and a moving plate having both ends supported by a plurality of elastic support portions coupled to the base frame, the moving plate having a first side on which a reflective mirror for changing a light path is disposed. At least one first rib is disposed along an edge of a second side of the moving plate, which is a reverse side of the first side of the moving plate, a second rib is disposed in the center of the second side of the moving plate to surround a permanent magnet, and a portion of the second side of the moving plate, except for the first and second ribs, is removed to a predetermined depth to reduce the weight of the entire moving plate and to define the first and second ribs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
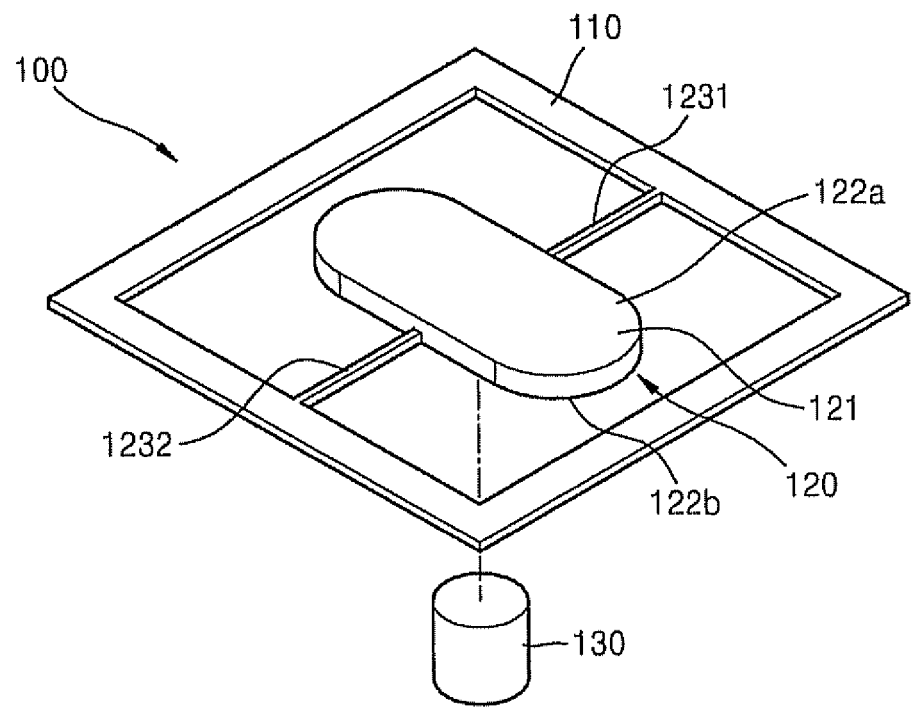
FIG. 1 is a perspective view of a microactuator according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
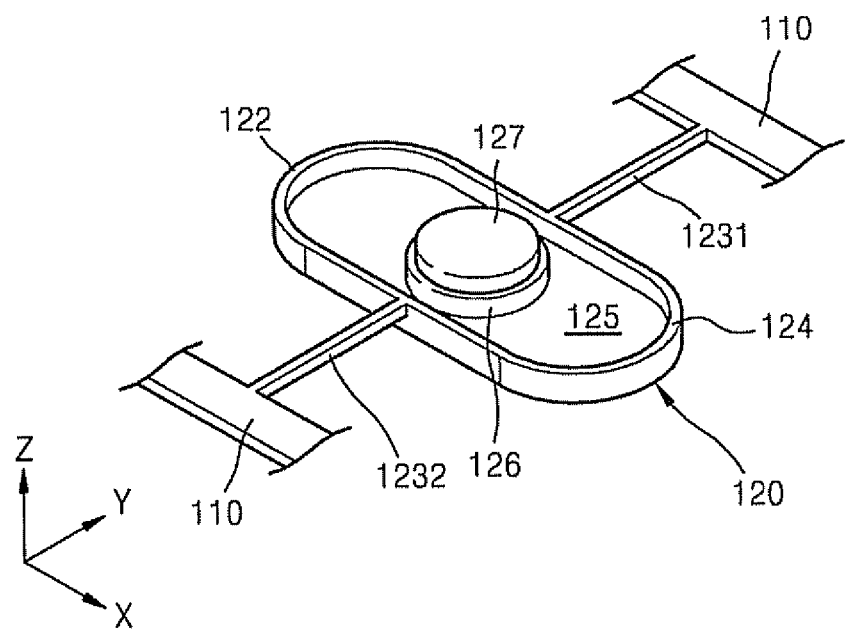
FIG. 2 is a perspective view of a rear surface of the microactuator shown in FIG. 1.
Figure 3:
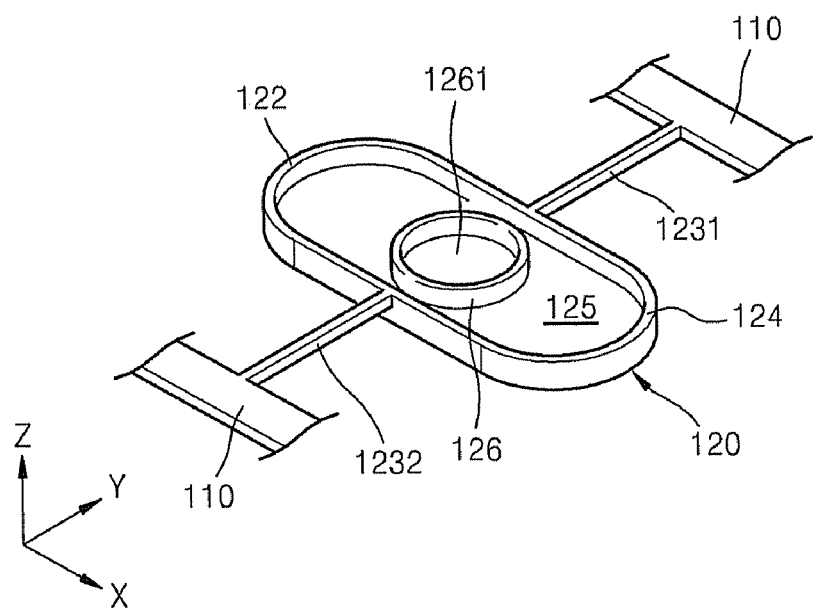
FIG. 3 is a perspective view of the microactuator, shown in FIG. 2, from which a permanent magnet is removed.

FIG. 1 is a perspective view of a microactuator 100 according to an embodiment of the present invention. FIG. 2 is a perspective view of a rear surface of the microactuator 100 shown in FIG. 1. FIG. 3 is a perspective view of the microactuator 100, shown in FIG. 2, from which a permanent magnet 127 has been removed.

Referring to FIGS. 1 through 3, the microactuator 100 includes a base frame 110 and a moving plate 120 respectively supported by a plurality of elastic support portions 1231 and 1232 that are inside the base frame 110. According to other aspects of the invention, the microactuator 100 may include additional and/or different components. Similarly, two or more of the above components may be integrated into a single unit. The components of the microactuator 100 may be composed of any material.

A reflective mirror 121, for reflecting light so as to change a light path, is disposed on a first side of the moving plate 120. The permanent magnet 127 is disposed on a second side 122b of the moving plate 120, which is the reverse side of the first side 122a of the moving plate 120. The permanent magnet 127 interacts with a coil portion 130 installed opposite the second side 122b of the moving plate 120. The moving plate 120 is supported by the elastic support portions 1231 and 1232 and moves up and down at a predetermined angle. The reflective mirror 121 reflects light according to movement of the moving plate 120, thereby changing the light path.

Referring to FIG. 2, a first rib 124 and a second rib 126 protrude from the second side 122b of the moving plate 120. The first rib 124 is formed as a closed curve along an edge of the second rib 122 of the moving plate 120. The second rib 126 is formed as a circle having a predetermined diameter through the center of the second side 122b of the moving plate 120 and correspondingly encloses the permanent magnet 127. A portion of the moving plate 120 is removed to a predetermined depth to result in a first space 125 and a second space 1261. The space 125 and the second space 1261 of the second side 122b of the moving plate 120 may be removed to the same depth. The removal of the portions of the moving plate 120 may be performed using an etching process. The weight of the moving plate 120 is reduced by the weight of the portions removed from the moving plate 120.

The center of mass of the moving plate 120, supported by the elastic support portions 1231 and 1232, may be on an axis of rotation of the moving plate 120 due to the elastic support portions 1231 and 1232. This construction prevents the moving plate 120 from inclining toward any one of the elastic support portions 1231 and 1232 and allows the moving plate 120 to move smoothly. When removing the portions of the moving plate 120, the thickness of the moving plate 120, the positions of the first and second ribs 124 and 126, and the etched depth and width may be adjusted such that the center of mass of the moving plate 120 is coplanar with the axis of rotation thereof. As in the current embodiment, microactuators according to additional aspects of the present invention may be constructed such that the center of mass of a moving plate is on an axis of rotation thereof.

Figure 4:
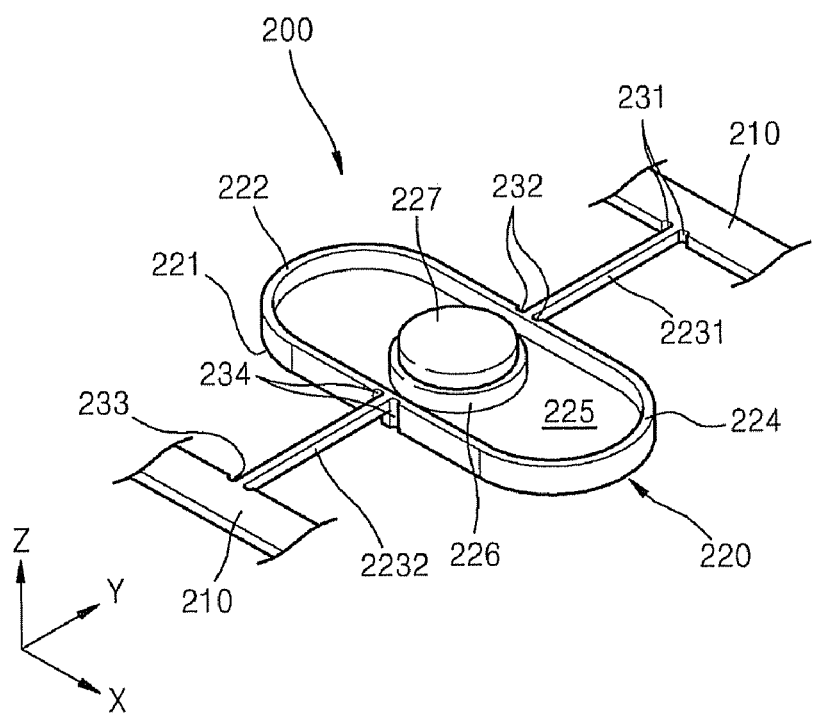
FIG. 4 is a perspective view of a microactuator according to another embodiment of the present invention.

FIG. 4 is a perspective view of a microactuator 200 according to another embodiment of the present invention. The microactuator 200 has the same construction as the microactuator 100 shown in FIGS. 1 through 3 except for notches 231, 232, 233, and 234.

The microactuator 200 includes a base frame 210 and a moving plate 220 supported by a plurality of elastic support portions 2231 and 2232 inside the base frame 210. A reflective mirror (not shown), for reflecting light, is disposed on a first side 221 of the moving plate 220. A first rib 224 and a second rib 226 protrude from a second side 222 of the moving plate 220, which is the reverse side of the first side 221 of the moving plate 220. The first rib 224 is formed as a closed curve along an edge of the second side 222 of the moving plate 220. The second rib 226 is formed as a circle having a predetermined diameter through the center of the second side 222 of the moving plate 220 and correspondingly encloses a permanent magnet 227. A portion of the moving plate 220 is removed to a predetermined depth to result in a space 225, thereby reducing the weight of the microactuator 200.

The two notches 231 are formed at a connection portion between the elastic support portion 2231 and the base frame 210, and the two notches 232 are formed at a connection portion between the elastic support portion 2231 and the first rib 224. The two notches 233 are formed at a connection portion between the elastic support portion 2232 and the base frame 210, and the two notches 234 are formed at a connection portion between the elastic support portion 2232 and the first rib 224. Stress induced during the driving of the moving plate 220 is centered on the connection portions between the elastic support portions 2231 and 2232 and the base frame 210 and the first rib 224. Thus, the notches 231, 232, 233, and 234 may be formed at the connection portions as described above. The notches 231, 232, 233, and 234 may be formed by partially removing portions of the first rib 224 and the base frame 210 and function to reduce stress centered on the connection portions between the elastic support portions 2231 and 2232 and the base frame 210 and the first rib 224.

The following Table 1 shows measurement results of stress and resonance frequency in the case of the absence and presence of the notches 231, 232, 233, and 234.

TABLE 1

|  | Absence of notches | Presence of notches | Comparison rate(%) |
|---|---|---|---|
| Resonance Frequency [Hz] | 2754 | 2722 | −1.16 |
| Stress [MPa] | 1219 | 1076 | −11.75 |

Referring to Table 1, if the notches 231, 232, 233, and 234 are present in the microactuator 200, the resonance frequency is slightly reduced by 1.16% less than when the notches 231, 232, 233, and 234 are not present. Similarly, the stress is reduced by 11.75% less than when the notches 231, 232, 233, and 234 are not present.

A moving plate should meet different demands so that a microactuator may operate under high-speed and large-displacement conditions. The resonance frequency of the moving plate should be increased to drive the microactuator at high speed, while the stress of the moving plate should be decreased to drive the microactuator with a large displacement. However, the stress and the resonance frequency usually increase or decrease together, so it is difficult to increase the resonance frequency and decrease the stress at the same time.

As shown in Table 1, when the notches 231, 232, 233, and 234 are formed in the microactuator 200, the resonance frequency is hardly reduced, but the stress is markedly reduced. Thus, the formation of the notches 231, 232, 233, and 234 in the microactuator 200 allows the microactuator 200 to operate with a large displacement.

Figure 5:
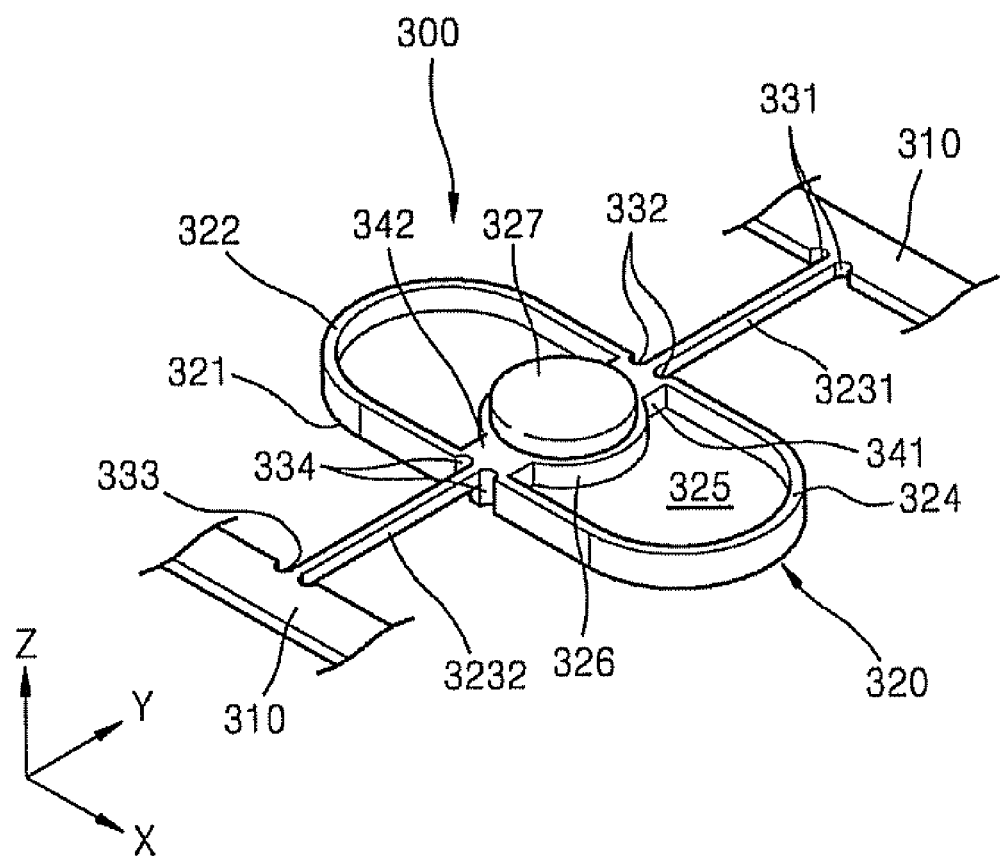
FIG. 5 is a perspective view of a microactuator according to another embodiment of the present invention.

FIG. 5 is a perspective view of a microactuator 300 according to another embodiment of the present invention. The microactuator 300 has the same construction as the microactuator 200 shown in FIG. 4 except for a plurality of connection portions 341 and 342.

The microactuator 300 includes a base frame 310 and a moving plate 320 supported by a plurality of elastic support portions 3231 and 3232 inside the base frame 310. A reflective mirror (not shown), for reflecting light, is disposed on a first side 321 of the moving plate 320. A first rib 324 and a second rib 326 protrude from a second side 322 of the moving plate 320, which is the reverse side of the first side 321 of the moving plate 320. The first rib 324 is formed as a closed curve along an edge of the second side 322 of the moving plate 320. The second rib 326 is formed as a circle having a predetermined diameter through the center of the second side 322 of the moving plate 320 and correspondingly encloses a permanent magnet 327. A portion of the moving plate 320 is removed to a predetermined depth to result in a space 325, thereby reducing the weight of the entire microactuator 300. The second rib 326 may have the same construction as the second rib 126 shown in FIG. 3.

The two notches 331 are formed at a connection portion between the elastic support portion 3231 and the base frame 310, and the two notches 332 are formed at a connection portion between the elastic support portion 3231 and the first rib 324. Similarly, the two notches 333 are formed at a connection portion between the elastic support portion 3232 and the base frame 310, and the two notches 334 are formed at a connection portion between the elastic support portion 3232 and the first rib 324. Stress induced during the driving of the moving plate 320 is centered on the connection portions between the first and second elastic support portions 3231 and 3232 and the base frame 310 and the first rib 324. Thus, the notches 331, 332, 333, and 334 may be formed at the connection portions as described above.

The notches 331, 332, 333, and 334 are formed by partially removing portions from the first rib 324 and the base frame 310 and function to reduce stress centered on the connection portions between the first and second elastic support portions 3231 and 3232 and the base frame 310 and the first rib 324. The notches 331, 332, 333, and 334 need not be present in all aspects of the invention.

The connection portion 341 and the connection portion 342 are formed between the first and second ribs 324 and 326 in a lengthwise direction (or Y direction) of the elastic portions 3231 and 3232 to connect the first and second ribs 324 and 326. The connection portions 341 and 342 are non-removed portions of the moving plate 320 when the space 325 is formed in the moving plate 320. The connection portions 341 and 342 improve the stiffness of the moving plate 320. The microactuator 300, which includes the connection portions 341 and 342, is stiffer than the microactuator 200 shown in FIG. 4.

Figure 6:
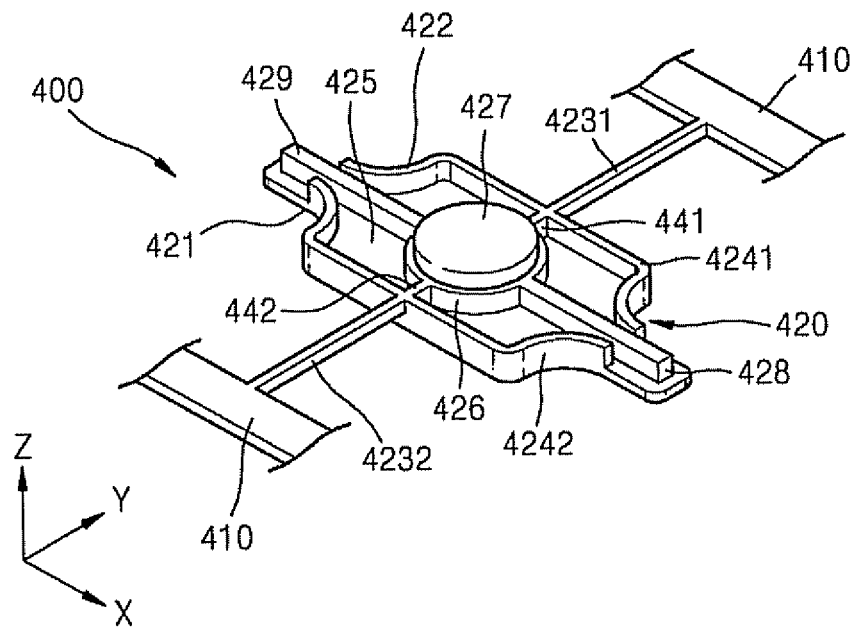
FIG. 6 is a perspective view of a microactuator according to another embodiment of the present invention.

FIG. 6 is a perspective view of a microactuator 400 according to another embodiment of the present invention. The microactuator 400 includes a base frame 410 and a moving plate 420 supported by a plurality of elastic support portions 4231 and 4232 inside the base frame 410. A reflecting mirror (not shown), for reflecting light, is disposed on a first side 421 of the moving plate 420, and a portion of a second side 422 of the moving plate 420, which is the reverse side of the first side 421 of the moving plate 420, is partially removed to a predetermined depth to reduce the weight of the moving plate 420.

The moving plate 420 includes a plurality of first ribs 4241 and 4242 and a second rib 426. The first ribs 4241 and 4242 protrude from the second side 422 of the moving plate 120, along an edge of the second side 422 of the moving plate 420 and are separated from each other. The second rib 426 protrudes in the Z-direction as a circle having a predetermined diameter through the center of the second side 422 of the moving plate 420 and correspondingly encloses a permanent magnet 427. The second rib 426 may have the same construction as the second rib 126 shown in FIG. 3.

The moving plate 420 further includes a first connection portion 441, which connects the first and second ribs 4231 and 426 in a lengthwise direction (or Y direction) of the first and second elastic support portions 4231 and 4232, and a second connection portion 442, which connects the first and second ribs 4232 and 426. The moving plate 420 also include a plurality of third ribs 428 and 429, each of which is connected to the second rib 426 through the first and second connection portions 442 and 441, and protrudes from the second rib 426 in an X direction. Each of the third ribs 428 and 429 is separated from the first ribs 4241 and 4242 that are symmetrical with respect to the third ribs 428 and 429.

The removed portion of the moving plate 420, which is removed to the predetermined depth, results in the formation of the first ribs 4241 and 4242, the second rib 426, the first and second connection portions 441, 442, and the third ribs 428 and 429. Thus, the weight of the microactuator 400 is reduced due to the removed portion, and the microactuator 400 can maintain high stiffness due to the first ribs 4241 and 4242, the second rib 426, the first and second connection portions 441, 442, and the third ribs 428 and 429. Although not shown in FIG. 6, notches, such as the ones shown in FIGS. 4 and 5, may be further formed to alleviate stress concentration.

Figure 7:
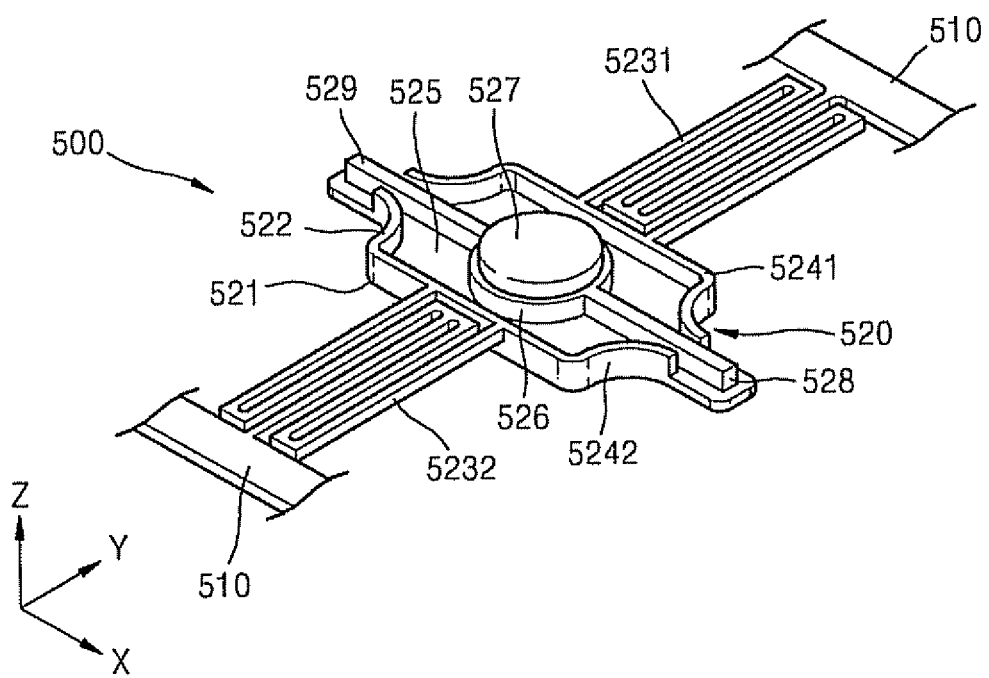
FIG. 7 is a perspective view of a microactuator according to another embodiment of the present invention.

FIG. 7 is a perspective view of a microactuator 500 according to another embodiment of the present invention. The microactuator 500 includes a base frame 510 and a moving plate 520 supported by a plurality of elastic support portions 5231 and 5232 inside the base frame 510. A reflecting mirror (not shown), for reflecting light, is disposed on a first side 521 of the moving plate 520, and a portion of a second side 522 of the moving plate 520, which is the reverse side of the first side 521 of the of the moving plate 520, is partially removed to a predetermined depth to reduce the weight of the moving plate 520.

The elastic support portions 5231 and 5232 have different shapes from the elastic support portions shown in FIGS. 1 through 6. Specifically, two members that are separated from each other and disposed in a predetermined length in a Y direction are folded to form each of the elastic support portions 5231 and 5232, so that the elastic support portions 5231 and 5232 can have their own torsional elasticity. The elastic support portions 5231 and 5232 may have higher torsional elasticity than the elastic support portions shown in FIGS. 1 through 6.

The moving plate 520 includes a plurality of first ribs 5241 and 5242 and a second rib 526. The first ribs 5241 and 5242 protrude along an edge of the second side 522 of the moving plate 520 and are separated from each other. The second rib 526 (shown as 560) protrudes as a circle having a predetermined diameter through the center of the second side 522 of the moving plate 520 and correspondingly encloses a permanent magnet 527. The second rib 526 may have the same construction as the second rib 126 shown in FIG. 3. According to other aspects of the invention, the first ribs 5241 and 5242 and the second rib 526 may be arranged as shown in FIG. 1.

Furthermore, the moving plate 520 includes a plurality of third ribs 528 and 529, each of which is connected to the second rib 526 and protrudes from the second rib 526 in an X direction. Each of the third ribs 528 and 529 is separated apart from the first ribs 5241 and 5242 that are symmetrical with respect to the third ribs 528 and 529. The third ribs 528 and 529 need not be present in all aspects of the present invention.

The removed portion of the moving plate 520, which is removed to the predetermined depth, results in the formation of the first ribs 5241 and 5242, the second rib 526, and the third ribs 528 and 529. Thus, the weight of the microactuator 500 is reduced due to the removed portion, and the microactuator 500 can maintain high stiffness due to the first ribs 5241 and 5242, the second rib 526, and the third ribs 528 and 529. Although not shown in FIG. 7, notches, such as the ones shown in FIGS. 4 and 5, may be further formed to alleviate stress concentration, and a plurality of connection portions may be further installed to connect the first ribs 5241 and 5242 with the second rib 526.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A microactuator comprising:
   a base frame; and
   a moving plate having both ends supported by a plurality of elastic support portions coupled to the base frame, the moving plate having a first side on which a reflective mirror to change a light path is disposed,
   wherein at least one first rib is disposed along an edge of a second side of the moving plate, which is a reverse side of the first side of the moving plate, a second rib is disposed in the center of the second side of the moving plate to surround a permanent magnet, and a portion of the second side of the moving plate, except for the first and second ribs, is removed to a predetermined depth so as to reduce the weight of the entire moving plate and to define the first and second ribs.

2. The microactuator of claim 1, wherein:
   the first rib is disposed as a closed curve along the edge of the second side of the moving plate; and
   a region where the permanent magnet enclosed by the second rib is installed is removed to the same depth as the removed portion of the second side of the moving plate.

3. The microactuator of claim 1, further comprising at least one notch disposed at each of a plurality of connection portions between the elastic support portions and the base frame and between the elastic support portions and the moving plate.

4. The microactuator of claim 3, further comprising a plurality of connection portions disposed on the second side of the moving plate in a lengthwise direction of the elastic support portions, each connection portion connecting the first and second ribs.

5. The microactuator of claim 1, wherein:
   a plurality of first ribs protrude along the edge of the second side of the moving plate and are separated apart from one another; and
   the microactuator further comprises a plurality of third ribs protruding from the second side of the moving plate, each third rib having one end connected to the second rib and another end extending along the same axial line to pass between the first ribs and be separated apart from the first ribs when passing between the first ribs.

6. The microactuator of claim 5, wherein each of the elastic support portions is folded several times to have a torsional elasticity.

7. The microactuator of claim 5, further comprising a plurality of connection portions disposed in a lengthwise direction of the elastic support portions, each connection portion connecting the first and second ribs.

8. A microactuator comprising:
   a moving plate having a first side on which a reflective mirror is disposed;
   a plurality of elastic supports to support the moving plate, each of the plurality of elastic supports coupled to a base frame;
   at least one first rib disposed along an outer edge of a second side of the moving plate; and
   a second rib disposed in the center of the moving plate so as to create a space in which a permanent magnet to drive the microactuator is installed.

9. The microactuator of claim 8, wherein the at least one first rib and the second rib are formed by removing portions of the second side of the moving plate to a predetermined depth so as to reduce the weight of the microactuator.

10. The microactuator of claim 8, further comprising at least one notch arranged at a point where the plurality of elastic supports connect with the moving plate.

11. The microactuator of claim 8, further comprising a plurality of connection portions arranged on the second side along an axis of the microactuator parallel to the plurality of elastic supports, to connect the at least one first rib to the second rib.

12. The microactuator of claim 8, further comprising:
    a plurality of third ribs disposed along an axis of the moving plate perpendicular to the plurality of elastic supports, each of the plurality of third ribs connected to the second rib; and
    wherein the at least one first rib comprises a plurality of first ribs separated from each other, and each of the plurality of third ribs passes through a space created by the separation of the plurality of first ribs.

13. The microactuator of claim 8, wherein each of the plurality of elastic supports is folded at least once so as to have a torsional elasticity.

14. The microactuator of claim 8, wherein the microactuator is installed within an image forming apparatus.

15. The microactuator of claim 8, wherein the moving plate has an oval shape.

16. The microactuator of claim 8, wherein the second rib has an oval shape.

17. The microactuator of claim 8, wherein the moving part is arranged so as to have a center of mass aligned with an axis of rotation of the moving part.

* * * * *